(12) United States Patent
Gunuganti

(10) Patent No.: US 12,368,643 B2
(45) Date of Patent: Jul. 22, 2025

(54) MULTI-TENANT POLICY FRAMEWORK

(71) Applicant: Alkira, Inc., San Jose, CA (US)

(72) Inventor: Ramakanth Gunuganti, San Jose, CA (US)

(73) Assignee: ALKIRA, INC., San Jose, CA (US)

( * ) Notice: Subject to any disclaimer, the term of this patent is extended or adjusted under 35 U.S.C. 154(b) by 103 days.

(21) Appl. No.: 17/998,748

(22) PCT Filed: Apr. 15, 2021

(86) PCT No.: PCT/US2021/027571
§ 371 (c)(1),
(2) Date: Nov. 14, 2022

(87) PCT Pub. No.: WO2021/211908
PCT Pub. Date: Oct. 21, 2021

(65) Prior Publication Data
US 2024/0015074 A1    Jan. 11, 2024

Related U.S. Application Data

(60) Provisional application No. 63/010,611, filed on Apr. 15, 2020.

(51) Int. Cl.
*G06F 15/173* (2006.01)
*H04L 41/0893* (2022.01)
(Continued)

(52) U.S. Cl.
CPC .......... *H04L 41/12* (2013.01); *H04L 41/0893* (2013.01); *H04L 41/0894* (2022.05);
(Continued)

(58) Field of Classification Search
CPC .............. H04L 41/122; H04L 41/0893; H04L 41/0894; H04L 41/0895
See application file for complete search history.

(56) References Cited

U.S. PATENT DOCUMENTS

| 2017/0302535 A1 | 10/2017 | Lee |
| 2018/0309629 A1 | 10/2018 | Mohanram et al. |
| 2019/0386891 A1* | 12/2019 | Chitalia ................ G06F 3/0481 |

OTHER PUBLICATIONS

International Search Report and Written Opinion for related International Application No. PCT/US2021/027571, mailed Aug. 2, 2021, (7 Pages).

* cited by examiner

*Primary Examiner* — Padma Mundur
(74) *Attorney, Agent, or Firm* — Vani Moodley, Esq.

(57) ABSTRACT

Disclosed is a network topology visualization system comprising: branch connector instances; branch connectors, wherein each grouping of the branch connector instances has a corresponding grouping of branch microsegment edges and each node of each grouping of the branch connector instances has a corresponding edge of a corresponding grouping of branch connector edges; virtual private cloud (VPC) connectors; and a cloud exchange node. The cloud exchange node includes: a service group; applications coupled to the VPC connectors via VPC segment edges; connector groups, coupled to the branch connectors via branch segment edges, wherein each of the branch segment edges uniquely couples a branch connector to a connector group; and a visualization engine that provides a visualization facilitated by connector construct abstraction of a network topology for a network of a customer.

14 Claims, 3 Drawing Sheets

(51) Int. Cl.
*H04L 41/0894* (2022.01)
*H04L 41/0895* (2022.01)
*H04L 41/12* (2022.01)
*H04L 41/122* (2022.01)
*H04L 41/40* (2022.01)

(52) U.S. Cl.
CPC ........ *H04L 41/0895* (2022.05); *H04L 41/122* (2022.05); *H04L 41/40* (2022.05)

MULTI-TENANT POLICY FRAMEWORK

CROSS-REFERENCE TO RELATED APPLICATIONS

This application is a national phase application pursuant to 35 U.S.C. § 371 of International Application No. PCT/US2021/027571, entitled "MULTI-TENANT POLICY FRAMEWORK", and filed on Apr. 15, 2021, which claims benefit of U.S. Provisional Application No. 63/010,611, entitled "MULTI-TENANT POLICY FRAMEWORK", and filed on Apr. 15, 2020, which is incorporated herein by reference in its entirety.

DETAILED DESCRIPTION

Figure 1:
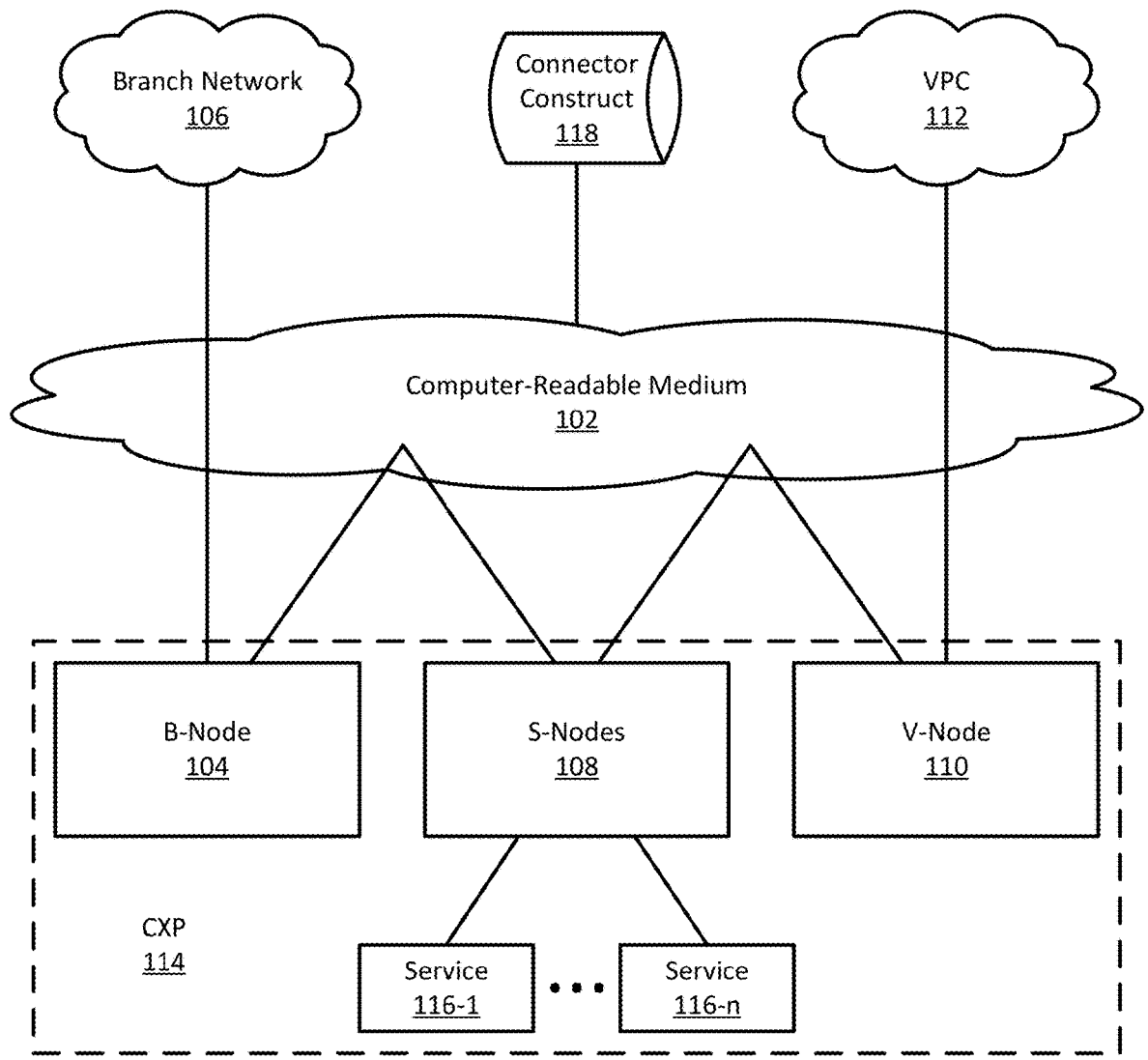
FIG. 1 is a diagram of an example of a system with a multi-tenant policy framework.

FIG. 1 is a diagram 100 of an example of a system with a multi-tenant policy framework. The diagram 100 includes a computer-readable medium (CRM) 102, a branch-facing node (B-node) 104 coupled to the CRM 102, a branch network 106 coupled to the B-node 104 through the CRM 102, service point attachment nodes (S-nodes) 108 coupled to the CRM 102, a virtual network facing node (V-Node) 110 coupled to the CRM 102, a virtual private cloud (VPC) 112 coupled to the V-Node 110 through the CRM 102, and a connector datastore 118. In the diagram 100, a cloud services exchange platform (CXP) 114 includes the B-node 104, the S-nodes 108, the V-node 110, and a service engine 116-1 to a service engine 116-n (collectively, the services 116) coupled to the S-nodes 108.

The CRM 102 in intended to represent a computer system or network of computer systems. A "computer system," as used herein, may include or be implemented as a specific purpose computer system for carrying out the functionalities described in this paper. In general, a computer system will include a processor, memory, non-volatile storage, and an interface. A typical computer system will usually include at least a processor, memory, and a device (e.g., a bus) coupling the memory to the processor. The processor can be, for example, a general-purpose central processing unit (CPU), such as a microprocessor, or a special-purpose processor, such as a microcontroller.

Memory of a computer system includes, by way of example but not limitation, random access memory (RAM), such as dynamic RAM (DRAM) and static RAM (SRAM). The memory can be local, remote, or distributed. Non-volatile storage is often a magnetic floppy or hard disk, a magnetic-optical disk, an optical disk, a read-only memory (ROM), such as a CD-ROM, EPROM, or EEPROM, a magnetic or optical card, or another form of storage for large amounts of data. During execution of software, some of this data is often written, by a direct memory access process, into memory by way of a bus coupled to non-volatile storage. Non-volatile storage can be local, remote, or distributed, but is optional because systems can be created with all applicable data available in memory.

Software in a computer system is typically stored in non-volatile storage. Indeed, for large programs, it may not even be possible to store the entire program in memory. For software to run, if necessary, it is moved to a computer-readable location appropriate for processing, and for illustrative purposes in this paper, that location is referred to as memory. Even when software is moved to memory for execution, a processor will typically make use of hardware registers to store values associated with the software, and a local cache that, ideally, serves to speed up execution. As used herein, a software program is assumed to be stored at an applicable known or convenient location (from non-volatile storage to hardware registers) when the software program is referred to as "implemented in a computer-readable storage medium." A processor is considered "configured to execute a program" when at least one value associated with the program is stored in a register readable by the processor.

In one example of operation, a computer system can be controlled by operating system software, which is a software program that includes a file management system, such as a disk operating system. One example of operating system software with associated file management system software is the family of operating systems known as Windows from Microsoft Corporation of Redmond, Wash., and their associated file management systems. Another example of operating system software with its associated file management system software is the Linux operating system and its associated file management system. The file management system is typically stored in the non-volatile storage and causes the processor to execute the various acts required by the operating system to input and output data and to store data in the memory, including storing files on the non-volatile storage.

The bus of a computer system can couple a processor to an interface. Interfaces facilitate the coupling of devices and computer systems. Interfaces can be for input and/or output (I/O) devices, modems, or networks. I/O devices can include, by way of example but not limitation, a keyboard, a mouse or other pointing device, disk drives, printers, a scanner, and other I/O devices, including a display device. Display devices can include, by way of example but not limitation, a cathode ray tube (CRT), liquid crystal display (LCD), or some other applicable known or convenient display device. Modems can include, by way of example but not limitation, an analog modem, an IDSN modem, a cable modem, and other modems. Network interfaces can include, by way of example but not limitation, a token ring interface, a satellite transmission interface (e.g. "direct PC"), or other network interface for coupling a first computer system to a second computer system. An interface can be considered part of a device or computer system.

Computer systems can be compatible with or implemented as part of or through a cloud-based computing system. As used in this paper, a cloud-based computing system is a system that provides virtualized computing resources, software and/or information to client devices. The computing resources, software and/or information can be virtualized by maintaining centralized services and resources that the edge devices can access over a communication interface, such as a network. "Cloud" may be a marketing term and for the purposes of this paper can include any of the networks described herein. The cloud-based computing system can involve a subscription for services or use a utility pricing model. Users can access the protocols of the cloud-based computing system through a web browser or other container application located on their client device.

A computer system can be implemented as an engine, as part of an engine, or through multiple engines. As used in this paper, an engine includes at least two components: 1) a dedicated or shared processor or a portion thereof; 2) hardware, firmware, and/or software modules executed by the processor. A portion of one or more processors can include some portion of hardware less than all of the hardware comprising any given one or more processors, such as a subset of registers, the portion of the processor dedicated to one or more threads of a multi-threaded processor, a time slice during which the processor is wholly or partially dedicated to carrying out part of the engine's functionality, or the like. As such, a first engine and a second engine can have one or more dedicated processors, or a first engine and a second engine can share one or more processors with one another or other engines. Depending upon implementation-specific or other considerations, an engine can be centralized, or its functionality distributed. An engine can include hardware, firmware, or software embodied in a computer-readable medium for execution by the processor. The processor transforms data into new data using implemented data structures and methods, such as is described with reference to the figures in this paper.

The engines described in this paper, or the engines through which the systems and devices described in this paper can be implemented, can be cloud-based engines. As used in this paper, a cloud-based engine is an engine that can run applications and/or functionalities using a cloud-based computing system. All or portions of the applications and/or functionalities can be distributed across multiple computing devices and need not be restricted to only one computing device. In some embodiments, the cloud-based engines can execute functionalities and/or modules that end users access through a web browser or container application without having the functionalities and/or modules installed locally on the end-users' computing devices.

As used in this paper, datastores are intended to include repositories having any applicable organization of data, including tables, comma-separated values (CSV) files, traditional databases (e.g., SQL), or other applicable known or convenient organizational formats. Datastores can be implemented, for example, as software embodied in a physical computer-readable medium on a general- or specific-purpose machine, in firmware, in hardware, in a combination thereof, or in an applicable known or convenient device or system. Datastore-associated components, such as database interfaces, can be considered "part of" a datastore, part of some other system component, or a combination thereof, though the physical location and other characteristics of datastore-associated components is not critical for an understanding of the techniques described in this paper.

Datastores can include data structures. As used in this paper, a data structure is associated with a way of storing and organizing data in a computer so that it can be used efficiently within a given context. Data structures are generally based on the ability of a computer to fetch and store data at any place in its memory, specified by an address, a bit string that can be itself stored in memory and manipulated by the program. Thus, some data structures are based on computing the addresses of data items with arithmetic operations; while other data structures are based on storing addresses of data items within the structure itself. Many data structures use both principles, sometimes combined in non-trivial ways. The implementation of a data structure usually entails writing a set of procedures that create and manipulate instances of that structure. The datastores, described in this paper, can be cloud-based datastores. A cloud based datastore is a datastore that is compatible with cloud-based computing systems and engines.

Assuming a CRM includes a network, the network can be an applicable communications network, such as the Internet or an infrastructure network. The term "Internet" as used in this paper refers to a network of networks that use certain protocols, such as the TCP/IP protocol, and possibly other protocols, such as the hypertext transfer protocol (HTTP) for hypertext markup language (HTML) documents that make up the World Wide Web ("the web"). More generally, a network can include, for example, a wide area network (WAN), metropolitan area network (MAN), campus area network (CAN), or local area network (LAN), but the network could at least theoretically be of an applicable size or characterized in some other fashion (e.g., personal area network (PAN) or home area network (HAN), to name a couple of alternatives). Networks can include enterprise private networks and virtual private networks (collectively, private networks). As the name suggests, private networks are under the control of a single entity. Private networks can include a head office and optional regional offices (collectively, offices). Many offices enable remote users to connect to the private network offices via some other network, such as the Internet.

The B-Node 104 is intended to represent an engine that couples the branch network 106 to the CXP 114. In a specific implementation, the B-node is responsible for branch-to-cloud traffic. For example, the branch network 106 is intended to represent a campus, site, data center, or other branch network under the control of a customer. In a specific implementation, the B-node 104 creates an overlay to connect a network branch to the cloud. Data traffic originating from the branch network 106 within a given region may be controlled, managed, observed, and evaluated by the CXP 114. In a specific implementation, the customer, or a human or artificial agent thereof, managing the branch network 106, or a portion thereof, can access a single portal to select one or more of the services 116 in connection with a software as a service (SaaS), IaaS, or PaaS offering. In a specific implementation, the B-node 104 (potentially including other B-nodes, not shown) connects the CXP 114 to multiple different branch networks.

The S-nodes 108 are intended to represent multi-tenant node engines adapted to orchestrate the instantiation, hosting, and/or provisioning of the services 116 (selected via a portal accessible in association with the CXP 114) to one or more endpoints on behalf of a customer. S-nodes 108 may host services and apply policies that might otherwise only be available through other cloud platforms, in other regions or otherwise only available with certain connectivity. For instance, if a customer using Cloud Platform A desired certain security features provided by Firewall X service that was only available through Cloud Platform B, the S-nodes 108 may, via an orchestration component, host the Firewall X service for the customer so that the customer may obtain the service as though they were using Cloud Platform B. Even if a customer uses different cloud platforms or has different connectivity throughout different segments of its network, the dashboard of the CXP 114's portal may provide the foregoing features (e.g., monitoring traffic, managing connectivity, etc.) within the same dashboard interface. In a specific implementation, to effectuate these features, all data traffic is routed through the S-nodes 108.

The S-nodes 108 may send/receive traffic to and from networks implementing any type of connectivity (e.g., MPLS, SD-WAN, $IP_{SEC}$, etc.) and host services from any one or more providers so that the connecting networks may receive the benefit of those services without the hassle of reconfiguring their network to adapt to the service provider's requirements. The S-nodes 108 can instantiate such services automatically upon request, so that an individual user associated with or connected through the branch network 106 does not have to instantiate the services themselves. The S-nodes 108 may collect telemetry data (e.g., to share with a multi-tenant orchestrator component), may tie the data flow to an application once packet details have been determined, may conduct analytics (e.g., statistical analysis) on data flow on a tailored basis (e.g., one in every ten packets received may be subjected to a deep packet inspection routine), and may tag or add instructions to packets for execution at a workload.

The V-Node 110 is intended to represent an engine that couples the CXP 114 to the VPC 112. The VPC 112 is intended to represent a SaaS, IaaS, PaaS, or V-net. In a specific implementation, the V-node is responsible for cloud-to-cloud traffic. For example, the V-node 110 (potentially including other V-nodes, not shown) connects the CXP 114 to different clouds.

The CXP 114 is intended to represent a system that establishes connectivity, instantiates services for corresponding geolocations, aggregates data, implements policies, monitors traffic, and/or provide analytics across disparate cloud service providers and different connectivity architectures. In a specific implementation, CXP 114 operates in a manner that—to the customer—is connectivity agnostic and cloud provider agnostic. The CXP 114 may correspond to aggregated services offered for a given region or set of regions, where the regions may comprise one or more zones corresponding to subsections of such regions. The CXP 114 may service the branch network 106 within a particular region, and multiple CXPs may be stitched together as part of a larger cloud servicing network (e.g., mesh network, hub-and-spoke network, or a network having some other topology) to span multiple regions. In a specific implementation, the CXP 114 provides a portal through which a network administrator or other user associated with a customer may (i) view and select SaaS/IaaS/other services from a range of providers (or provided by the customer itself) within a common dashboard, (ii) manage connectivity (e.g., MLPS, SD-WAN, $IP_{SEC}$, etc.), (iii) monitor traffic, (iv) control traffic in accordance with one or more policies (e.g., security policies), etc.

The connector construct datastore 118 is intended to represent a datastore of constructs (data structures) defining branch and cloud connectivity abstractions referred to as a "connector" in this paper. This abstraction allows a policy definition to be agnostic to type of present or future connectors. Groups are generic and can point to any connector defined in any control or data plane, allowing application of policy to a single connector, a single connector type, or a group of connectors.

In a specific implementation, each connector is assigned a unique route tag ID. As routes are learned from a connector using, e.g., BGP, they are tagged with a specific route tag. (A collection of routing tags at the datapath layer is an example of a connector group.) When traffic hits a datapath, a source route, destination route lookup determines the route tags that map to a source and destination group. Policy can be applied to the source and destination groups when processing traffic. Because policy is tied to dynamic routing, any changes to connector subnets are automatically handled without any manual intervention. Policy can be applied between connectors across CXPs in multiple regions. Inter region traffic can still be deterministically steered using the same rules as in a single CXP to other service functions.

Advantageously, the connector construct datastore 118 enables the creation of a policy framework with multiple advantages. For example, administrators can configure connectors/services of a network in a region, in multiple regions, in a group, individually, or in some other incredibly flexible manner. As is discussed in greater detail later, connector constructs are a component of a policy framework that allows visualization of a network while configuring and applying policy on the network.

Figure 2:
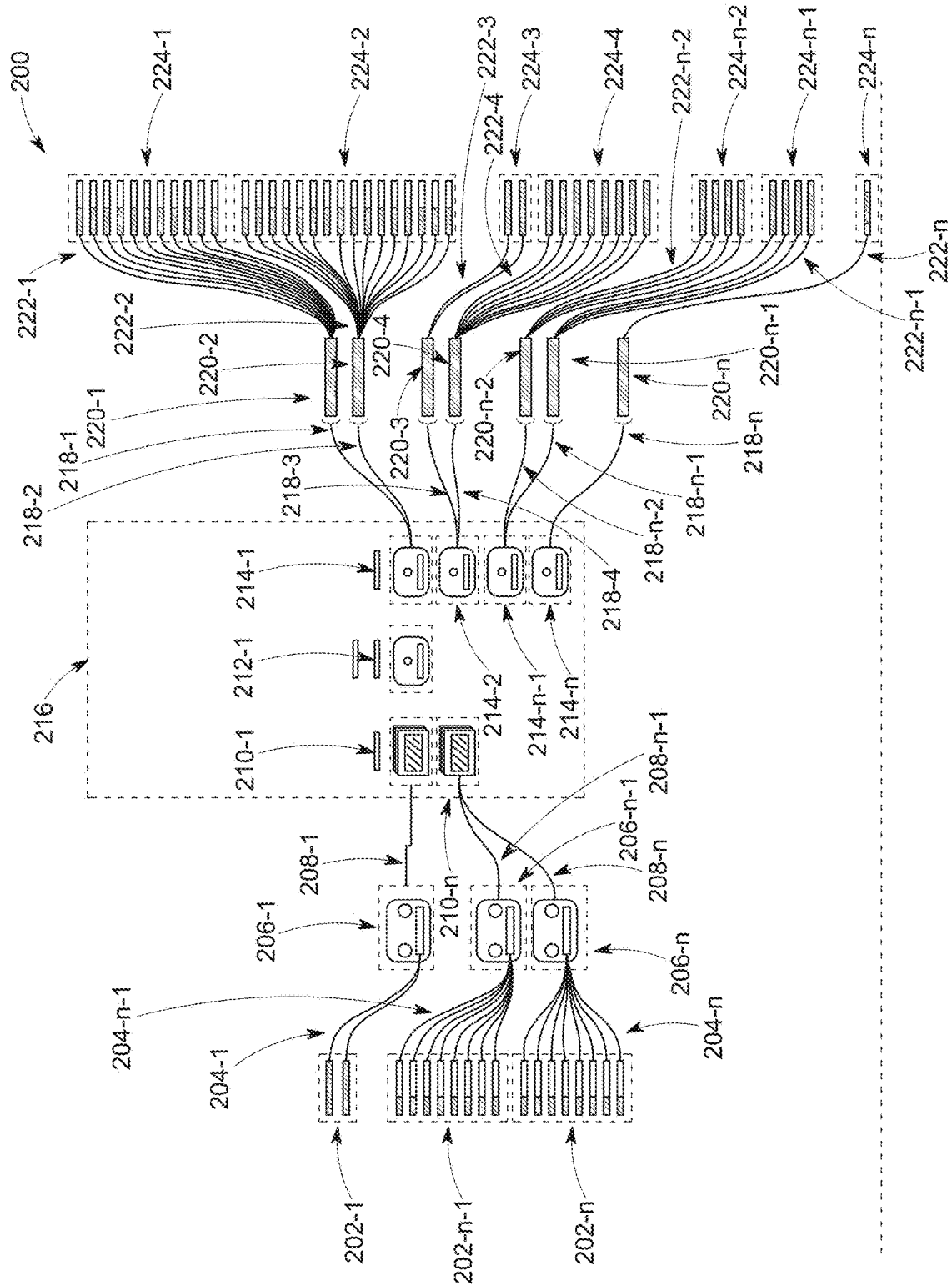
FIG. 2 is a screenshot of a network topology visualization for a multitenant system implementation.

FIG. 2 is a screenshot 200 of a network topology visualization for a multitenant system implementation. The names used to label components of the screenshot are in some cases arbitrary. The screenshot 200 includes branch connector instances 202-1 to branch connector instances 202-n (collectively, branch connector instances 202) coupled, via branch microsegment edges 204-1 to branch microsegment edges 204-n (collectively, branch microsegment edges 204), to branch connector 206-1 to branch connector 206-n (collectively, branch connectors 206). Each grouping of the branch connector instances 202 (e.g., the branch connector instances 202-1) have a corresponding grouping of the branch microsegment edges 204, and each node of each grouping of the branch connector instances 202 has a corresponding edge of the corresponding grouping of branch connector edges 204.

The branch connectors 206 are coupled, via branch segment edge 208-1 to branch segment edge 208-n (collectively, branch segment edges 208), to connector group 210-1 to connector group 210-n (collectively, connector groups 210). Each of the branch segment edges 208 uniquely couples a branch connector to a connector group (e.g., the branch connector 206-1 is uniquely coupled to the connector group 210-1 via the branch segment edge 208-1), but each branch connector can have more than one branch segment edge (e.g., the branch connector 206-n–1 and the branch network root node 206-n are uniquely coupled, via the connector node edge 208-n–1 and the branch segment edge 208-n, respectively, to the connector group 210-n). Although it may vary by implementation, in a specific implementation, if policy changes for a connector within a connector group, a new connector group is spawned for the variant connector. Instead or in addition, functionality can allow the modification of a connector group to include wildcards or other variables that enable the visualization of connectors with different parameters as a distinct group.

The connector groups 210, along with service group 212 (of which only one is provided by way of example) and an application 214-1 to an application 214-n (collectively, the applications 214), comprise a cloud exchange node 216.

The applications 214 are coupled, via a VPC segment edge 218-1 to a VPC segment edge 218-n (collectively, the VPC segment edges 218), to VPC connector 220-1 to VPC connector 220-n (collectively, the VPC connectors 220). Each of the VPC segment edges 218 uniquely couples a VPC connector to an application (e.g., the VPC connector 220-n is uniquely coupled to the application 214-n via the VPC segment edge 218-n), but each application can have more than one VPC segment edge (e.g., the VPC connector 220-1 and the VPC connector 220-2 are uniquely coupled, via the VPC segment edge 218-n–1 and the VPC segment edge 218-2, respectively, to the application 214-1).

The VPC connectors 220 are coupled, via VPC microsegment edges 222-1 to VPC microsegment edges 222-n (collectively, the VPC microsegment edges 222), to VPC instances 224-1 to VPC instances 224-n (collectively, the VPC instances 224). Each grouping of the VPC instances 224 (e.g., the VPC instances 224-1) have a corresponding grouping of the VPC microsegment edges 222, and each node of each grouping of the VPC instances 224 has a corresponding edge of the corresponding grouping of VPC microsegment edges 222.

In a specific implementation, the VPC microsegment edges 222 and VPC segment edges 218 are color coded such that the VPC microsegment edges subsumed by a VPC segment are visually identifiable as microsegments of the segment. Instead or in addition, a segment can extend from a branch instance to a VPC instance, with a corresponding color coding of all segments (branch and VPC) and microsegments (branch and VPC) to make the segment visually identifiable as such.

The branch connector instances 202 can represent whatever is deemed useful for network topology visualization. In a specific implementation, however, the branch connector instances 202 represent ingress and egress points of a branch network, such as CPE, virtualized CPE (vCPE), SD-WAN appliances, or the like, and can include groupings of such devices. In a specific implementation, the branch connector instances 202 are color coded to identify branch connectors that are running properly (e.g., by a green color), branch connectors that are down (e.g., by a red color), or, if applicable, branch connectors that are partially down (e.g., by a yellow color). Other status indications are also possible. Advantageously, the visualization, facilitated by the connector construct abstraction, allows a customer to see a network topology for their own network in a manner that requires no knowledge outside that which is under the control of the customer and, if appropriately configured, all of the ingress and egress points of the branch network to the cloud.

The branch microsegment edges 204 are intended to represent a visual link between ingress/egress points of a branch network and a conceptual representation of the connectors themselves. In an implementation in which the microsegment edges 204 are associated with a visually-identifiable policy (e.g., via color coding) a branch network admin can quickly ascertain policy associated with microsegments. In an implementation in which the microsegment edges 204 are selectable, a branch network admin can conveniently select, review, and update microsegment policy.

The branch connectors 206 are intended to represent constructs that can be used to facilitate visualization of branch network segments. In a specific implementation, the visualization includes such information as network type (e.g., Cisco SD-WAN, $IP_{SEC}$, or the like), network name, a status bar, and a value indicative of the number of branch connector instances. The status bar can be used to indicate whether all branch connector instances are up (e.g., with a green color code or with a slider that is moved all the way to the right), all branch connector instances are down (e.g., with a red color code or a slider that is moved all the way to the right), or one or more branch connector instances are up and one or more branch connector instances are down (e.g., with a yellow color code or a slider that is neither all the way to the left nor all the way to the right).

The branch segment edges 208 are intended to represent a visual link between a branch connector and branch connector group. In a specific implementation, the branch microsegment edges 204 and branch segment edges 208 are color coded such that the branch microsegment edges subsumed by a branch segment are visually identifiable as microsegments of the segment. Microsegments can be referred to as part of a segment that subsumes the microsegments. Instead or in addition, microsegments can be given variant coloration to indicate some other feature, such as connector group memberships for connectors with different parameters.

The connector groups 210 are intended to represent constructs grouped in a manner that is meaningful to a branch network administrator. For example, the connector groups 210 can comprise connectors of a particular network segment, having a particular policy or rule association, or having some other common characteristic. In a specific implementation, the connector groups 210 have status indicators, such as a connector group name (or branch network type), status bar that indicates whether connectors comprising a connector group are all up, all down, or somewhere in between, and segment buttons that, when selected, highlight (or display only) a segment associated with the selected segment button. With respect to the segment button, for example, if a "pink" segment button is selected, the "pink" segment and connectors of the segment may be depicted to the exclusion of other segments (and associated connectors).

The service group 212 represents services available to a branch network, either currently (e.g., because they have been purchased or licensed or are available for free) or with some effort (e.g., by unlocking access to them). In a specific implementation, rules allow traffic to be steered to a service like stateful firewall or load balancer for service functions to be applied to the traffic. The applications 214, VPC segments 218, VPC connectors 220, VPC microsegments 222, and VPC instances 224 are similar to corresponding components on the branch network side in that they can be selected, are associated with policy and status, etc.

Advantageously, in an implementation that includes selectable status indicators, an admin can expand, collapse or filter nodes by name, health, type, or segment to focus on areas of interest. Selection can include expanding, zooming into, or highlighting a segment, connectors/services, or groups associated with a policy by hovering over the relevant object, mouse clicking on the object, or selecting the object in some other fashion. Panning and zooming the visualization is believed to provide a thorough understanding of the network in a manner that is comfortable to a human agent. The ability to visualize the health of each instance in the network enables a rapid response by a human agent that, when supplemented with artificial agents, provides a synergy between the capabilities of human and machine. The human can thereby more readily visualize aggregated health of the connectors/services and get its quantitative assessment and visually indicate states of each connector/service based on provisioned status.

Another advantage of the UI visualization described above is an admin can view a draft of network provisioning prior to committing. Yet another is while configuring policy, an admin can visualize the connectors/services and groups on which policy will be applied.

Figure 3:
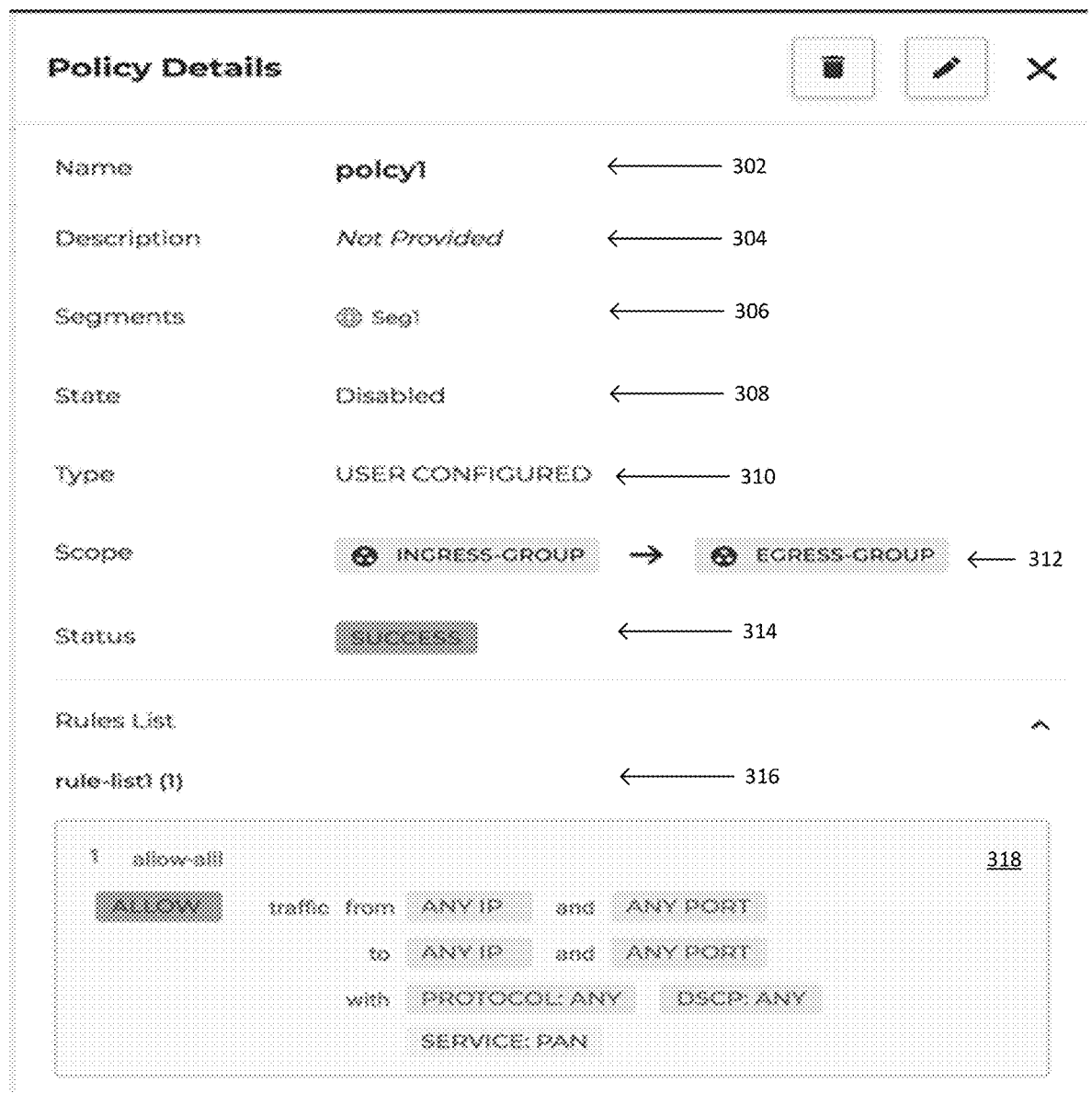
FIG. 3 is a screenshot of a policy details window.

FIG. 3 is a screenshot 300 of a policy details window. The screenshot 300 includes a policy name field 302, a policy description field 304, a segments field 306, a state field 308, a type field 310, a scope field 312, a status field 314, a set of rule fields 316, and a rule panel 318. In the example of FIG. 3, the policy name is policy 1; a description is not provided; segments include only Seg1; state is disabled; and type is user-configured.

With respect to state, although there is no protocol running between because cloud doesn't support, an adjacent "hello" mechanism can be used to determine whether a node is up or down and publish the information to a controller. A dBase server associated with the controller can maintain an active topology. Each node can read from the dBase and route accordingly. The dBase can be implemented as ETCD-key-value pair but any applicable datastore fast enough not to impact throughput (might provision for higher than throughput) and a couple seconds redundancy is probably good enough. The datastore can be characterized as a tunnel state datastore.

Scope indicates from "INGRESS GROUP" to "EGRESS GROUP" but, due at least in part to the functionality facilitated by connector constructs as described above, ingress-group to egress-group can contain any type of connectors from any CXP. Policies can be defined across CXPs and are agnostic to the type of connector or the application. The policy framework allows for L4 to L7 rules to be attached to "segment, source group, destination group" or a collection of connectors (a group) attached to a CXP; the rules can be used to allow, deny traffic for a combination of source, destination, source ports, destination ports, applications (L4 to L7), protocol.

Scope can be applied to an entire dataplane or some discrete subset thereof. In a specific implementation, this happens in a tenant context that can be characterized with a {segment, source group, destination group} 3-tuple but the abstraction is driven by a route tag. For example, a traffic monitor can receive input, normalize, and give attributes, then add route identifier. Routing is a way to distribute to nodes and a way to enforce; a customer doesn't have to know attributes of routing, only that a policy is desirable for an identifiable route tag. Advantageously, if a customer adds a connector to ingress group, it becomes part of policy; if a customer deletes a connector, it is immediately removed. It may be noted, in a specific implementation, there is a per-tenant tunnel between nodes and, with an appropriate configuration, policy can be applied across tenants. Server can be per tenant (elastic).

The rule list field 316 can be expanded (or is automatically expanded) into the rule panel 318. Here, parameters of a policy or rule can be set using any identifiable characteristic of a connector, path, or other component.

What is claimed is:

1. A network topology visualization system comprising:
   a non-transitory computer-readable medium;
   a processor coupled to the non-transitory computer-readable medium;
   a branch-facing node coupled to the non-transitory computer-readable medium;
   a virtual network facing node coupled to the non-transitory computer-readable medium; and
   a connector datastore coupled to the non-transitory computer-readable medium, wherein the connector datastore stores connector constructs defining connectors;
   wherein the processor is configured to execute instructions stored in the non-transitory computer-readable medium to:
     obtain network configuration data from a virtual private cloud (VPC) coupled to the virtual network facing node;
     generate, based on the network configuration data and the connector constructs stored in the connector datastore, a network topology representation including:
       branch connector instances representing ingress and egress points of a branch network;
       branch connectors, wherein each grouping of the branch connector instances has a corresponding grouping of branch microsegment edges, and wherein each grouping of the branch connector instances is connected to a corresponding branch connector of the branch connectors via the corresponding grouping branch microsegment edges;
       VPC connectors coupled to VPC instances via first VPC segment edges; and
       connector groups, coupled to the branch connectors via branch segment edges, wherein each of the branch segment edges uniquely couples a branch connector to a connector group of the connector groups, wherein each connector group of the connector groups comprises branch connectors sharing at least one of a common network segment, a common policy association, or a common rule association;
     generate a visualization of the network topology representation;
     display, via a user interface, the visualization of the network topology, wherein the visualization includes:
       a service group representing services available to the branch network;
       information related to applications running on one or more cloud-based engines and coupled to the VPC connectors via second VPC segment edges;
       status indicators for the branch connector instances, the branch connectors, the VPC connectors, and the connector groups; and
       a plurality selectable elements, when activated, modify the visualization to highlight or filter at least one branch connector of the branch connectors, at least one branch connector instance of the branch connector instances, at least one VPC connector of the VPC connectors, and at least one connector group of the connector groups, each associated with a specific policy;
     receive a first user input via one of the plurality of selectable elements in the displayed visualization;
     control, in response to the received first user input, network traffic from the branch network using the specific policy; and
     modify the visualization based on the controlled traffic from the branch network.

2. The system of claim 1, wherein the processor is further configured to:
   detect a policy change for a specific branch connector of the branch connectors, wherein the specific branch connector is within a connector group of the connector groups;
   spawn a new connector group from the connector groups for the specific branch connector with the changed policy; and
   update the visualization to reflect the new connector group.

3. The system of claim 1, wherein a grouping of the VPC instances has a corresponding grouping of the first VPC segment edges.

4. The system of claim 1, wherein each of the second VPC segment edges uniquely connects a VPC connector to an application of the applications running on one or more cloud-based engines.

5. The system of claim 1, wherein
   a branch microsegment edge from the grouping of branch microsegment edges, a branch segment edge from the branch segment edges, a first VPC segment edge from the first VPC segment edges, and a second VPC segment edge from the second VPC segment edges extends as a segment extending from a specific branch connector instance of the branch connector instances to a specific VPC instance of the VPC instances, and the processor is further configured to apply color coding to the segment extending from the specific branch connector instance to the specific VPC instance to make the segment visually identifiable in the visualization.

6. The system of claim 1, wherein the processor is further configured to apply:
   a first color to a first set of branch connector instances of the branch connector instances, wherein the first set of branch connector instances are associated with a first set of branch connectors of the branch connectors that are running properly,
   a second color to a second set of branch connector instances of the branch connector instances, wherein the second set of branch connector instances are associated with a second set of branch connectors of the branch connectors that are down, and
   a third color to a third set of branch connector instances of the branch connector instances, wherein the third set of branch connector instances are associated with a third set of branch connectors of the branch connectors that are partially down.

7. The system of claim 1, wherein the processor is further configured to apply color coding to the first VPC segment edges and the second VPC segment edges in the visualization such that the first VPC segment edges subsumed by a VPC segment are visually identifiable as microsegments of the segment.

8. The system of claim 1, wherein each of the branch connectors in the visualization include representations of:
   a network type,
   a network name,
   a status bar indicating operational status, and
   a value indicative of a number of branch connector instances of the branch connector instances associated with a corresponding branch connector of the branch connectors.

9. The system of claim 1, wherein the processor is further configured to apply color coding to the branch microsegment edges and the branch segment edges in the visualization such that branch microsegment edges subsumed by a branch segment are visually identifiable as microsegments of the branch segment.

10. The system of claim 1, wherein the service group in the visualization includes representations of services available to the branch network upon activation of access to those services.

11. The system of claim 1, wherein the processor is further configured to:
    apply rules to steer the network traffic from the branch network to the services including a stateful firewall or a load balancer for application of service functions associated with the services to the network traffic; and
    update the visualization to reflect the applied rules and traffic steering.

12. The system of claim 1, wherein the plurality of selectable elements includes status indicators that, when activated, cause the processor to expand, collapse, or filter nodes in the visualization by at least one of name, health status, type, or network segment.

13. The system of claim 1, wherein the processor is further configured to:
    receive a second user input selecting at least one of the plurality of selectable elements in the visualization; and
    in response to the second user input, modify the visualization to expand, zoom into, or highlight
    the at least one branch connector,
    at least one branch connector instance,
    at least one VPC connector, or
    at least one connector group.

14. The system of claim 1, wherein the processor is further configured to:
    generate a view of a draft of network provisioning configuration based on the network topology representation prior to committing.

* * * * *